United States Patent
Young

(10) Patent No.: US 7,377,981 B2
(45) Date of Patent: May 27, 2008

(54) METHOD AND APPARATUS FOR CLEANING OPTICAL CONNECTOR

(75) Inventor: Marvin R. Young, Richardson, TX (US)

(73) Assignee: Pivotal Decisions LLC, Las Vegas, NV (US)

( * ) Notice: Subject to any disclaimer, the term of this patent is extended or adjusted under 35 U.S.C. 154(b) by 114 days.

(21) Appl. No.: 10/454,005

(22) Filed: Jun. 3, 2003

(65) Prior Publication Data

US 2003/0221710 A1 Dec. 4, 2003

Related U.S. Application Data

(60) Provisional application No. 60/386,102, filed on Jun. 4, 2002.

(51) Int. Cl.
*B08B 7/00* (2006.01)
(52) U.S. Cl. .......................... 134/6; 134/42; 15/104.05
(58) Field of Classification Search .................... 134/6, 134/42, 166 C, 169 C, 201; 15/21.1, 97.1, 15/5, 104.05
See application file for complete search history.

(56) References Cited

U.S. PATENT DOCUMENTS 6,047,716 A * 4/2000 Shimoji et al. .......... 134/166 C
6,769,150 B1 * 8/2004 Liu et al. ...................... 15/21.1
6,839,935 B2 * 1/2005 Kiani et al. .................... 15/345

OTHER PUBLICATIONS

Fiber Optic Swabs by Tansen Company Ltd.
Hi-Tech Electronics—Borescope-Fiberscope-Videoscope.

* cited by examiner

*Primary Examiner*—Michael Barr
*Assistant Examiner*—Saeed T. Chaudhry
(74) *Attorney, Agent, or Firm*—Woodcock Washburn LLP

(57) ABSTRACT

The present invention provides a method and apparatus for delivering a cleaning and inspection device to an appropriate position on a backplane having an optical connector. A set of tubes corresponding to the number of optical connectors is attached to the rear of a connector assembly or some other similar device capable of being coupled to a connector housing containing the optical connector. The diameter of the hollow tube large enough to accommodate the insertion of several types of cleaning and inspection devices including optical cleaning swabs and scopes. After the connector assembly is mated with the connector housing, the tubes can provide direct access to each optical connector for cleaning and inspection.

21 Claims, 3 Drawing Sheets

METHOD AND APPARATUS FOR CLEANING OPTICAL CONNECTOR

CROSS-REFERENCE TO RELATED APPLICATIONS

This application claims priority to Provisional Application Ser. No. 60/386,102, entitled "Optical Connector Cleaning Method", by Young, filed Jun. 4, 2002.

FIELD OF THE INVENTION

This invention relates to cleaning optical connectors and more particularly to cleaning optical connectors that exist on a backplane.

BACKGROUND OF THE INVENTION

The transmission, routing and dissemination of information has occurred over computer networks for many years via standard electronic communication lines. These communication lines are effective, but place limits on the amount of information being transmitted and the speed of the transmission. With the advent of light-wave technology, a large amount of information is capable of being transmitted, routed and disseminated across great distances at a high rate over communication lines made of optical fiber. An optical fiber is a strand of glass about the same diameter as a human hair. Light travels down the core of the fiber reflecting off a mirror-like interface where the glass core and a protective sleeve or cladding meet.

In most fiber systems, dust and other contaminants are not a major problem as long as the "light", that is the optical signal, remains within the optical fiber. However, problems arise when the optical signal must pass from one fiber to another or where the optical signal must leave the fiber and enter a receiver or piece of test equipment, such as an optical power meter.

The most common mechanical arrangement to allow light to travel from one fiber to another is an optical connector. Fiber optic connector systems are designed to align two fiber ends so that the light signal will pass between them. A variety of connector types have evolved such as FC/PC, FC/APC, ST and SC, each with a distinct area of application and all known in the art.

FC/PC and FC/APC connectors are most commonly found in high-end singlemode fiber telecommunications systems. The term "FC" is a fiber connector designated by NTT. "PC" and "APC" describe the kind of polish applied to the connector end face. PC stands for physical contact. A PC connector has a polished convex end face. SPC and UPC are "super" polished and "ultra" polished with better back reflection specification than PC. APC stands for an angled physical contact. An APC connector has a polished end face angled at 8°.

ST and SC connectors are used in commercial wiring and are frequently used in multimode fiber applications in building and campus LAN cabling systems. ST or "standard termination" connectors use a twist on-twist off type of housing. SC or "standard connection" connectors use a push to snap on, and a push to snap off type of housing.

Most connector systems restrain the two fibers to be coupled within precision ferrules, which in turn are held in place by a housing. Within the housing, a precision alignment sleeve aligns the two ferrules and thus the two fibers. The fiber ends are flush with the ferrule ends and are polished to reduce loss of light. All modern connector designs involve physical contact between the two fiber ends. Loss of light at a connection is called insertion loss or attenuation and is measured in dB. Typically, attenuation for a mated pair of high quality connectors is 0.35 dB or less.

The optical return loss, which describes the amount of light reflected from the connection is less than −45 dB for PC, less than −55 dB for UPC, and less than −65 dB for APC.

Dust, dirt and other contaminants are a problem in such optical connections because they interfere with the passage of light from one fiber to another. Fiber optic connectors must be kept clean to ensure long life and to minimize transmission loss and optical return loss at the connection point. A single dust particle caught between two connectors will cause significant signal loss. Dust particles as small as 1 µm diameter on the optical fiber end can significantly degrade performance. Particles 8 µm in diameter or larger on the end of the core can cause a complete failure of the optical system.

Even worse, dust particles can scratch the polished fiber end, resulting in permanent damage. Because the fiber end areas make physical contact, if a connector is mated while contaminated, especially with hard or abrasive contaminant particles, fiber end damage may occur, or the contaminant may get firmly bonded to the fiber end. This can lead to permanent physical damage to the fiber ends, which will necessitate replacement of the connector.

In order to avoid problems and to keep fiber ends in peak condition, connector cleaning must be undertaken frequently. Inspection of the fiber end quality also needs to be undertaken to determine if cleaning is required or if the connector is seriously damaged.

The two basic approaches to cleaning are wet and dry cleaning. Wet cleaning utilizes a solvent such as Isopropyl Alcohol and fiber optic swabs. The swabs have a head made of a soft nonabrasive material that has low particle and fiber generation. Dry cleaning takes a number of forms, but the most common approach involves a special alcohol-free cloth or textile cleaning tape or film on a reel inside a cartridge. The cartridge stores the tape reel and provides a window onto a short portion of the cloth tape for cleaning the fiber ends of connectors. Also, a fiber optical swab with a sticky or tacky head may be used. Dynamic cleaning devices are also available which "spin" a cleaning cloth across the end of the fiber.

Microscopic inspection must be conducted to confirm that cleaning is successful. On some occasions, even after repeated cleaning, inspection will show that the fiber end is damaged beyond recovery and the connector must be replaced. A variety of fiber connector inspection microscopes are available such as Hi-Tech Electronics Series 124000 borescopes, fiberscopes, and videoscopes. The general term "scope" will be used to refer to borescope, fiberscope and videoscope.

Optical connectors are normally removed and cleaned individually by hand. However, in recent years, it has become common to utilize multiple optical connectors composed of fiber arrays which attach to a backplane examples are the "MPX" from TYCO or the "HBMT" from MOLEX. A backplane is an electronic circuit board containing circuitry and sockets into which additional electronic devices on other circuit boards or cards can be plugged.

Optical connectors on a backplane are difficult to clean for several reasons. One reason is because the equipment housing the backplane and optical connectors is generally placed against a wall making access to the rear of the optical connectors difficult. Also, the optical connectors are small and difficult to handle when removed for cleaning so it is advantageous to be able to leave them in the system and clean the optical connectors via front access to the shelf. Another reason is that cleaning the optical connectors via front creates the possibility of contact with other system components causing catastrophic failure of the system. Another reason is that once the cleaning process is complete, all the fiber ends in the bundle must be clean.

Furthermore, due to the small scale of the optical connector, finding the correct position for the cleaning swab or inspection scope while viewing the backplane from the front is very difficult.

What is needed is a simple and reliable apparatus and method for cleaning and inspecting optical connectors inside a shelf where the connectors are not easily accessible. What is also needed is a simple and inexpensive mechanical system to position a cleaning device or inspection scope close to a connector on the backplane, while shielding other system components.

SUMMARY OF THE INVENTION

The present invention provides a method and apparatus for delivering a cleaning device to an appropriate position on a backplane optical connector. The purpose of the invention is to provide a simple and reliable solution to the cleaning of optical connectors inside a shelf where they are not directly accessible and provide a simple means of inspecting the connectors after the cleaning process is done.

Prior art systems suffer from the limitation that optical connectors are typically removed and cleaned individually by hand. If the optical connectors are not removed from the system, then cleaning and inspection is done by using swabs and a scope in an unconstrained free space. Using swabs and scopes in an unconstrained free space is risky because the swabs or scope can easily come into contact with other components in the system and possibly damage them.

The present invention is an improvement over the prior art because it provides a method and apparatus for alternatively delivering a cleaning and inspection device to an optical connector on a backplane. A set of tubes corresponding to the number of optical connectors is attached to the rear of a connector assembly. The diameter of the hollow tubes is large enough to accommodate the insertion of cleaning and inspection devices including optical cleaning swabs and scopes. After the connector assembly is mated with the connector housing, the tubes can provide direct access to each optical connector for cleaning and inspection.

The invention will be better understood from the following more detailed description taken in conjunction with the accompanying drawings.

DETAILED DESCRIPTION OF THE DRAWINGS

A better understanding of the invention can be obtained from the following detailed description of one exemplary embodiment as considered in conjunction with the following drawings in which.

DETAILED DESCRIPTION OF EXEMPLARY EMBODIMENTS

Figure 1:
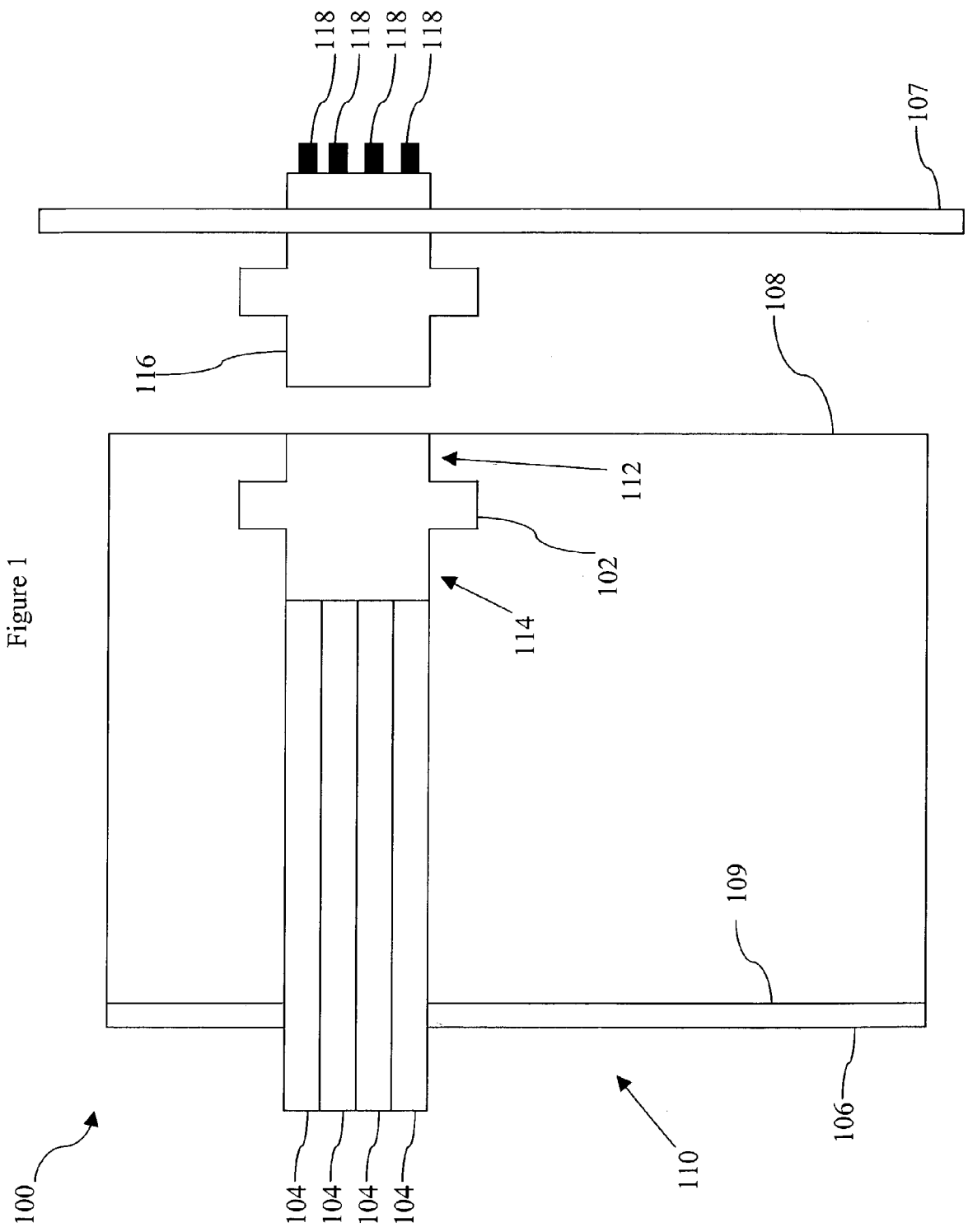
FIG. 1 is an optical connector cleaning card according to the present invention.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

FIG. 1 shows an optical connector cleaning card 100. Cleaning card 100 comprises system board 106, optical connector end 108, and cleaning tool insertion end 110. Attached to system board 106 is optical connector assembly 102 having connecting end 112 and tube attachment end 114. At least one hollow tube 104 is attached to tube attachment end 114 of optical connector assembly 102.

Also shown in FIG. 1 is optical connector housing 116 connected to a set of four single mode optical fibers 118 or arrays of fibers. Of course, cleaning card 100 can be used with either single mode or multimode fibers and the number of fibers is an array is arbitrary. The cleaning card 100 is adapted to be inserted into the backplane 107 like a typical system card.

In the preferred embodiment, system board 106 is constructed of a rigid material such as fiber board, PC board, or laminated plastic. The dimension of system board 106 is the same as the dimensions of standard system card. Other sizes can be used as is convenient. In one embodiment ridge 109 on system board 106 is used to locate and stabilize tubes 104. In another embodiment, system board 106 is not required as optical connector assembly 102 is supported only by tubes 104.

In the preferred embodiment, hollow tubes 104 are made of plastic or vinyl due to the inertness of these materials and their tendency not to generate extraneous fibers or contaminant particles. Also, an electrically insulating material is required for the typical environment. Hollow tubes 104 are typically attached to the connector assembly 102 by adhesive or other rigid mechanical attachment means. The attachment means should provide for an air tight seal between the connector and the tubes to prevent entry of contaminants such as fibers or dust particles.

Hollow tubes 104 may be attached to system board 106 by adhesive or other similar rigid mechanical attachment means. In a preferred embodiment hollow tubes 104 extend from the connector assembly 102 across system board 106 to tool insertion end 110. The diameter of hollow tubes in a preferred embodiment is approximately 0.4 mm but should be large enough to accommodate the insertion of different types of scopes as well as different types of cleaning devices.

Figure 3:
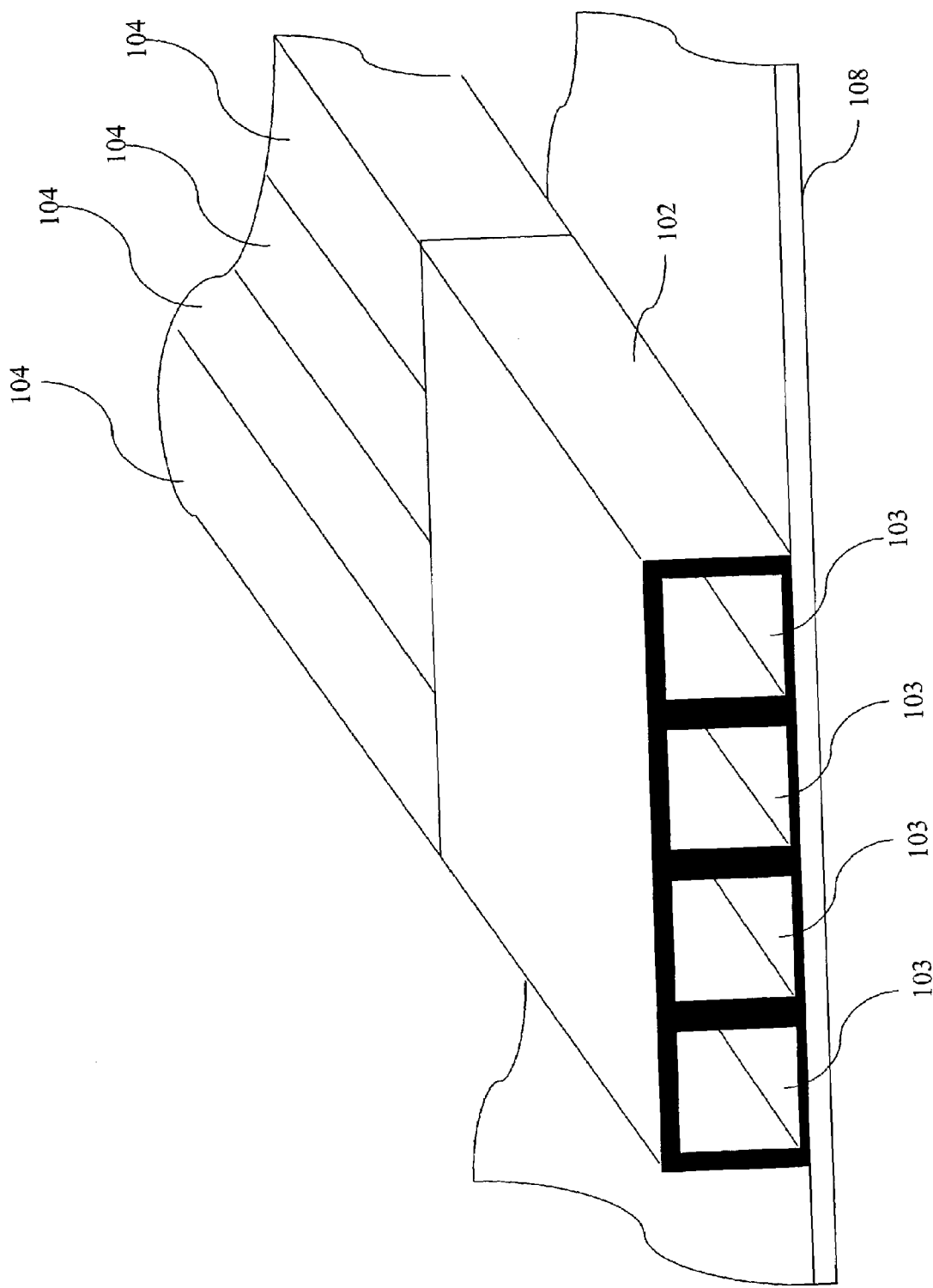
FIG. 3 is a front view of an optical connector assembly according to the present invention.

FIG. 3 is an isometric view of optical connector cleaning card 100. Optical connector end 108 is adapted to fit into receiving slots (not shown) on backplane 107. Openings 103 are adapted to fit over and engage with extensions on connector 116 to form a rigid mechanical connection. Optical cleaning end 108 is adapted to fit into backplane 107 to form a secure mechanical connection and is further adapted to prevent damage to electrical connectors on the backplane.

Optical connector assembly 102 is located on optical connector end 108 of system board 106. Connector assembly 102 is typically attached to system board 100 by adhesive or other similar rigid mechanical attachment. In the preferred embodiment, connector assembly 102 contains one or more multi fiber connectors. The number of tubes 104 can be expanded to allow for multiple multi-fiber connectors on the system board 106 as is required by the backplane.

Connector 102 is a typical connector assembly known in the art such as the MOLEX HBMT series or MOLEX MPMX series connectors.

Figure 2:
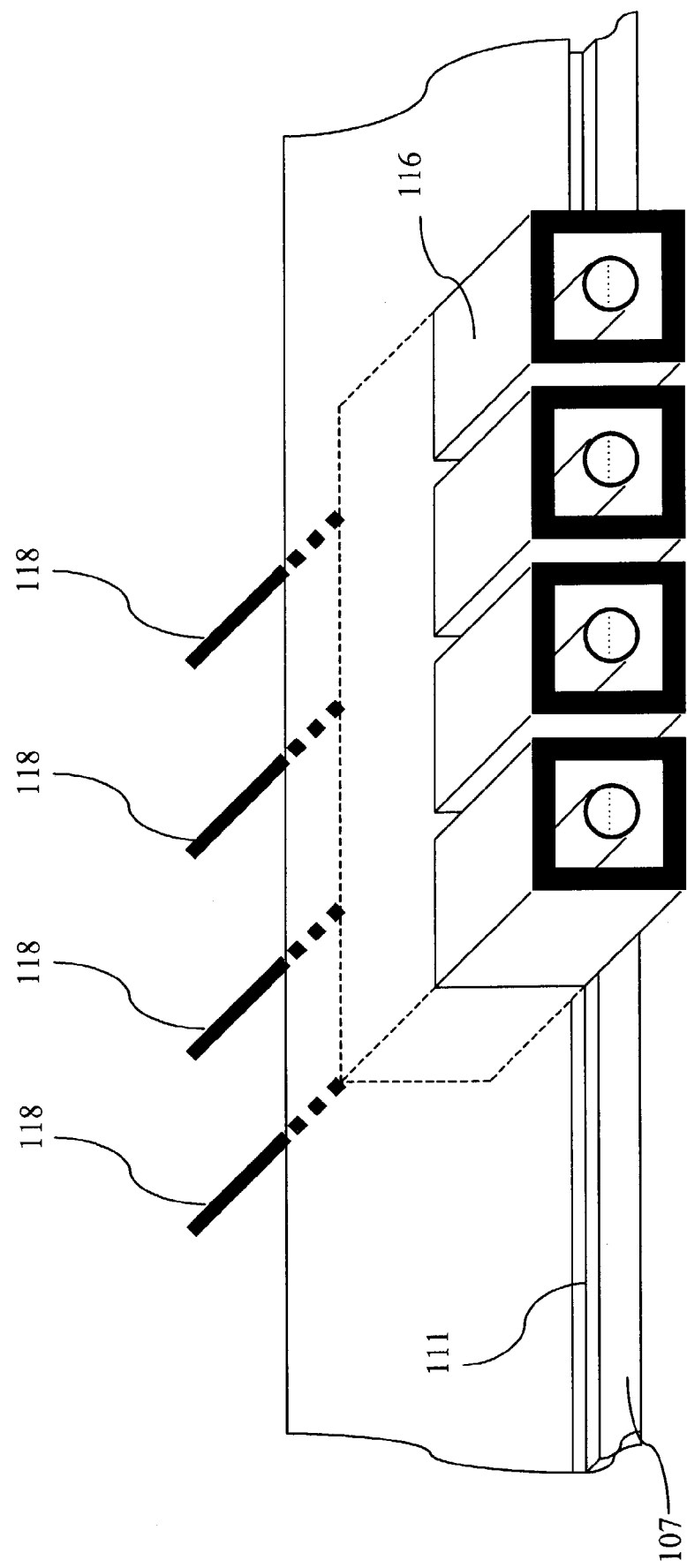
FIG. 2 is an isometric view of an optical connector housing according to the present invention.

FIG. 2 is an isometric view of optical connector housing 116 as connected to backplane 107. FIG. 2 shows receiving slot 111 on backplane 107 which accommodates optical connector end 108 when cleaning card 100 is inserted. Fibers 118 terminate at the end of optical connector housing 116 exposing the end of each fiber to be cleaned. When connected, connector 116 fits into connector assembly 102 to form a rigid mechanical connection which excludes foreign contaminates while fibers or fiber arrays 118 are being cleaned.

In use, cleaning card 100 is inserted into backplane 107 inserting the connector assembly 102 in optical connector housing 116. The connectors align tubes 104 with the fibers so that the fiber ends are approximately in the center of each tube.

Once the connector assembly 102 is attached to optical connector housing 116, each optical connector is accessed through the hollow tubes 104. In one method of cleaning an optical connector, a cleaning device such as a cleaning swab is inserted into the open end of the hollow tube 104. Then a cleaning swab is extended down the hollow tube 104 until the head of the cleaning swab comes into contact with the optical connector, cleaning may then take place. When finished, the cleaning swab is withdrawn from the hollow tube 104. A scope is then inserted in the end of the hollow tube 104 to determine if foreign particles or contaminants are present on the optical connector or if it is damaged. Hollow tube 104 supports the scope such that a steady image can be obtained. During cleaning, active components of the system are protected because the cleaning device is restrained by each hollow tube 104.

Although the invention has been described with reference to one or more preferred embodiments, this description is not to be construed in a limiting sense. There is modification of the disclosed embodiments, as well as alternative embodiments of this invention, which will be apparent to persons of ordinary skill in the art, and the invention shall be viewed as limited only by reference to the following claims.

The invention claimed is:

1. A method of facilitating access to an optical connector, the method comprising:
    positioning a hollow tubular guide substantially adjacent the optical connector, wherein the hollow tubular guide includes a first end and a second end opposite the first end, and wherein the first end of the hollow tubular guide is connected to a mating connector that is configured to connect to the optical connector;
    inserting a cleaning implement into the second end of the hollow tubular guide;
    guiding the cleaning implement to the optical connector at the first end of the hollow tubular guide; and
    accessing the optical connector with the cleaning implement.

2. The method of claim 1, wherein the hollow tubular guide permits accessing multiple fibers.

3. The method of claim 1, further comprising inspecting the optical connector.

4. The method of claim 1, further comprising moving the cleaning implement to clean the optical connector.

5. The method of claim 1, further comprising applying a solvent to the cleaning implement.

6. The method of claim 1, further comprising inserting an insertion card attached to the hollow tubular guide into a backplane.

7. The method of claim 1, wherein the hollow tubular guide includes a connector receiver.

8. The method of claim 1, wherein the hollow tubular guide includes a tube.

9. The method of claim 1, further comprising attaching the hollow tubular guide to the optical connector.

10. The method of claim 1, wherein the optical connector houses one or more optical fibers.

11. The method of claim 1, further comprising cleaning the optical connector with the cleaning implement.

12. The method of claim 1, wherein the cleaning implement comprises at least one of a swab or a dynamic cleaning device.

13. The method of claim 1, wherein a diameter of the hollow tubular guide is configured to allow entry of an inspection device.

14. The method of claim 1, further comprising attaching the hollow tubular guide to an insertion card.

15. The method of claim 14, further comprising attaching the insertion card to a backplane.

16. The method of claim 1, wherein the hollow tubular guide is a component of a connector assembly.

17. The method of claim 9, further comprising forming an airtight seal between the optical connector and the hollow tubular guide.

18. The method of claim 1, wherein the hollow tubular guide includes a diameter of approximately 0.4 mm.

19. The method of claim 1, wherein the cleaning implement is restrained by the hollow tubular guide.

20. The method of claim 1, wherein the mating connector is configured to align the hollow tubular guide with the optical connector such that a fiber end of the optical connector is approximately in a center of the hollow tubular guide.

21. The method of claim 1, further comprising inserting an inspection device through the hollow tubular guide.

* * * * *